United States Patent
Pilcher (10) Patent No.: US 12,188,495 B2
(45) Date of Patent: Jan. 7, 2025

(54) PRESSURE-MEDIUM CYLINDER HAVING A STATIC END-POSITION SEAL

(71) Applicant: AVENTICS GmbH, Laatzen (DE)

(72) Inventor: Martin Pilcher, Hannover (DE)

(73) Assignee: Aventics GmbH, Laatzen (DE)

( * ) Notice: Subject to any disclaimer, the term of this patent is extended or adjusted under 35 U.S.C. 154(b) by 0 days.

(21) Appl. No.: 18/041,471

(22) PCT Filed: Aug. 10, 2021

(86) PCT No.: PCT/DE2021/100682
§ 371 (c)(1),
(2) Date: Feb. 13, 2023

(87) PCT Pub. No.: WO2022/037746
PCT Pub. Date: Feb. 24, 2022

(65) Prior Publication Data
US 2023/0340973 A1    Oct. 26, 2023

(30) Foreign Application Priority Data
Aug. 15, 2020    (DE) .................. 10 2020 121 486.3

(51) Int. Cl.
*F15B 15/14*    (2006.01)
*F15B 15/22*    (2006.01)
(Continued)

(52) U.S. Cl.
CPC .......... *F15B 15/1461* (2013.01); *F15B 15/24* (2013.01); *F15B 15/1433* (2013.01);
(Continued)

(58) Field of Classification Search
CPC .. F15B 15/1433; F15B 15/1461; F15B 15/22; F15B 15/223; F15B 15/226; F15B 15/228; F15B 15/24; F16J 15/56
See application file for complete search history.

(56) References Cited

U.S. PATENT DOCUMENTS

| 2,736,294 A | | 2/1956 | Buehner | |
| 4,242,946 A | * | 1/1981 | Toliusis | F15B 15/226 91/394 |

FOREIGN PATENT DOCUMENTS

| DE | 26 51 398 A1 | 5/1978 | |
| DE | 102005025423 B4 * | 3/2011 | .......... F15B 15/1442 |

(Continued)

OTHER PUBLICATIONS

DE102005025423B4_t machine translation thereof (Year: 2011).*
(Continued)

*Primary Examiner* — Kenneth Bomberg
*Assistant Examiner* — Matthew Wiblin
(74) *Attorney, Agent, or Firm* — Maginot, Moore & Beck (57) ABSTRACT

A pressure-medium cylinder does not have a component that dynamically seals the piston rod and can be well-cleaned safely from outside. The pressure-medium cylinder includes a cylinder housing, a piston, a piston rod, and a static end-position seal. The piston is axially movably disposed in the cylinder housing. The piston rod is connected to the piston and penetrates the cylinder housing toward an end face through an outlet opening. The piston rod has a stop surface extending radially from the piston rod in a piston rod portion disposed outside of the cylinder housing. The stop surface contacts the cylinder housing in an end position during retracting of the piston rod and thus sealingly covers and/or extends around a gap region or gap regions between the piston rod and an edge of the outlet opening.

28 Claims, 5 Drawing Sheets

(51) Int. Cl.
   *F15B 15/24*   (2006.01)
   *F16J 15/56*   (2006.01)
(52) U.S. Cl.
   CPC ............ *F15B 15/22* (2013.01); *F15B 15/223* (2013.01); *F15B 15/226* (2013.01); *F15B 15/228* (2013.01); *F15B 2211/7052* (2013.01); *F15B 2211/7053* (2013.01); *F16J 15/56* (2013.01)

(56) References Cited

FOREIGN PATENT DOCUMENTS

| DE | 10 2015 112 351 A1 | 2/2017 | |
|---|---|---|---|
| JP | H1-172602 A | 7/1989 | |
| WO | WO-2022074284 A1 * | 4/2022 | .......... F15B 15/1433 |

OTHER PUBLICATIONS

JPH01172602A_t machine translation therof (Year: 1978).*
International Search Report corresponding to International Patent Application No. PCT/DE2021/100682, mailed Oct. 25, 2021 (5 pages).

* cited by examiner

PRESSURE-MEDIUM CYLINDER HAVING A STATIC END-POSITION SEAL

This application is a 35 U.S.C. § 371 National Stage Application of PCT/DE2021/100682, filed on Aug. 10, 2021, which claims the benefit of priority to Serial No. DE 10 2020 121 486.3, filed on Aug. 15, 2020 in Germany, the disclosures of which are incorporated herein by reference in their entirety.

The disclosure relates to a pressure-medium cylinder having a static end-position seal.

BACKGROUND

Pressure-medium cylinders are fluidly operated drive elements for converting a pressure as operating energy into a force, which are employed, e.g., as drive components of a linear drive. A piston, which can be pressurized using a pressure medium, is axially arranged within a cylinder housing. A machine part or workpiece can in turn be moved by the piston and by a piston rod connected to the piston and exiting an end face of the cylinder housing.

To seal the cylinder interior, the piston rod outlet is typically designed to have a dynamic ring seal and/or a wiper, with the piston rod moving with the piston stroke relative to the sealing component. In this case, the piston rod rubs against the seal. The permanently existing friction force due to the movement of the piston rod to the sealing component negatively affects achievable switch times in highly dynamic applications. At the same time, the sealing component is subject to relatively high wear, especially in highly dynamic applications, due to the frictional load. Finally, in hygienic design applications, requirements for a good cleanability of such pressure-medium cylinders can often only be met insufficiently, or only with a very high cleaning effort, due to the dead spaces, edges, and gaps created by the sealing component in the area of the piston rod outlet. The principles of hygienic design define requirements for the cleaning-compliant design of equipment and production equipment designed to produce food products. This requires, among other things, with respect to a pressure-medium cylinder used in the field of food processing, that it can easily be cleaned and disinfected from the outside after a production run and that chemicals can easily flow away, so that contamination of food by micro-organisms, material corrosion, or chemicals can be reliably avoided. Such contamination cannot be sufficiently and reliably avoided, e.g., when using a ring seal, due to the resulting ring gap.

Documents DE 26 51 398 A1 and DE 10 2015 112 351 A1 each disclose a pressure-medium cylinder having a piston rod exiting an end face and a stop surface extending radially from the piston rod in a piston rod portion disposed outside the cylinder housing. In the pressure-medium cylinder disclosed by DE 26 51 398 A1, the piston rod is guided out of the cylinder in a sealed manner on both sides. DE 10 2015 112 351 A1 does not disclose its own technical contribution to the issue of cylinder interior sealing.

SUMMARY

The object of the disclosure is to provide a pressure-medium cylinder with which the disadvantages of the prior art are avoided. In particular, a pressure-medium cylinder without a component that dynamically seals the piston rod and is well and securely cleanable from the outside is to be provided.

The object is achieved by means of a pressure-medium cylinder as disclosed herein.

The core of the disclosure is formed by a pressure-medium cylinder, comprising a cylinder housing, a piston disposed in said axially movable piston, a piston rod connected to the piston, penetrating the cylinder housing towards an end face through an outlet opening, wherein the piston rod is formed in a piston rod portion disposed external to the cylinder housing with a stop surface extending radially from the piston rod, which, when the piston rod is retracted, contacts the cylinder housing in an end position and thereby sealingly covers and/or extends around a gap region or gap regions between the piston rod and the edge of the outlet opening. Such a pressure-medium cylinder has a static end-position seal, by means of which the pressure-medium cylinder is sealed in the end-position in the retracted state, in that the stop surface sealingly covers and/or encompasses a gap region or gap regions between the piston rod and the edge of the outlet opening. The end position of the piston rod in the retracted state can be defined by the stop surface. The use of a dynamically sealing component is not required, thereby achieving a reduction in friction and an increase in actuator speed. At the same time, an effective and reliable cleanability of the pressure-medium cylinder from the outside in the retracted state is ensured, because the stop surface sealingly covers and/or extends around the outlet opening in this state. The pressure-medium cylinder can be designed as a single-acting cylinder or as a double-acting cylinder. In the embodiment as a double-acting cylinder, which is also pressurized on the piston rod side, leakage is deliberately accepted. In this case, debris entry is prevented due to the positive pressure existing in the cylinder chamber adjacent the outlet opening. Particularly in highly dynamic applications (e.g., sorting machines), the extended state only takes a small proportion of time, which is why leakage is acceptable compared to the advantages achieved by not having a dynamically sealing component. In the embodiment as a single-acting pressure-medium cylinder, in which the piston can only be pressurized using a working fluid in the extension direction, the risk of debris entry during operation into the cylinder chamber adjacent the outlet opening is either accepted, in particular during the retraction movement, or through further measures, e.g., an installed position inclined downwards or an additional enclosure of the pressure-medium cylinder, is reduced or prevented. By eliminating the need for a dynamic seal, breakaway and frictional forces of the piston rod are greatly reduced over static components of the cylinder housing, which enables operation with shorter shift and response times, especially in highly dynamic applications. Further, maintenance and repair related levels and downtime are significantly reduced as there is no need to replace more wear-intensive dynamic seals.

The sealing fit of the stop surface is improved, or simply ensured in a non-pressurized state, in that the cylinder housing is designed to have a return spring acting in this arranged retraction direction of the piston rod. The return spring causes a frictional fit in the end position of the piston rod between the end face of the cylinder housing and the stop surface.

A further improvement in the sealing fit is achieved by the stop surface being designed with a sealing body extending radially from the piston rod, or with the piston rod radially extending around the sealing body, which sealingly covers and/or extends around the gap regions between the piston rod and the edge of the outlet opening in the end position. The sealing body simultaneously acts as a brake body by absorbing the kinetic energy of the moving parts upon reaching the end position by deformation, and thus exerts a braking effect on the piston rod.

An improved tuning of the function and/or the service life of the sealing and braking components is enabled by the stop surface being designed to have a brake body extending radially from the piston rod, or to have multiple brake bodies radially adjacent to the piston rod, and to have a sealing body extending radially from the brake body or brake bodies radially extending around said brake body, which sealingly encompasses the gap regions between the piston rod and the edge of the outlet opening in the end position. In this case, the sealing body is preferably designed to have a larger installation height than the brake body or bodies and projects this or these towards the end face of the cylinder housing. At the same time, the sealing body in this embodiment is designed to have a higher resiliency than the brake body or brake bodies due to its shape and/or the material used. Due to the greater installation height, the sealing body, during the retraction movement of the piston rod, contacts the cylinder housing earlier than the brake body, whereby it exerts a first braking effect on the piston rod under deformation until the brake body or brake bodies designed to have a lower resiliency receive(s) the main portion of the energy. Due to the higher resiliency, the sealing body is compressed more strongly until the end position is reached than the brake body, which ensures a good sealing contact of the sealing body on the cylinder housing. In this embodiment, the sealing and brake bodies can be optimized in terms of material and design, i.e., to ensure the best possible function (density or brakes) along with the longest possible service life.

In a structurally inverted embodiment, the stop surface is designed to have a brake body extending radially from the sealing body, or to have multiple brake bodies arranged radially adjacent to the sealing body. In this embodiment, too, the sealing body is preferably designed to have a higher installation height and a higher resiliency than the brake body or brake bodies. In this embodiment, too, the sealing body contacts the cylinder housing earlier during the retraction movement and is compressed more strongly than the brake body or bodies until the end position is reached. In this embodiment, the sealing and brake bodies can also be optimized in terms of material and design, i.e., to ensure the best function possible in each case (density or brakes) with as high a service life as possible at the same time.

Further, in an alternative embodiment, instead of the stop surface, the cylinder housing on the end face can also be designed in a comparable manner to have sealing and/or brake bodies, in which case the sealing body in the retracted end position of the piston rod respectively sealingly contacts the stop surface.

In a structural modification of the pressure-medium cylinder, piston compression is also omitted, so that a gap region or gap regions are also formed between the piston and the inner wall of the cylinder housing. In this embodiment, dynamic seals are entirely omitted, thereby reducing breakout and friction forces as much as possible overall and enabling further shortened switching and response times. In this embodiment, additional internal leakage exists between the cylinder ridge formed on both sides of the piston. In an embodiment of the pressure-medium cylinder as a single-acting cylinder, in which the piston is pressurized using a working fluid in the extension direction, the extension motion of working fluid from the pressurized cylinder chamber passes through the gap region or gap regions formed between the piston and the inner wall of the cylinder housing to the unpressurized piston side and ultimately into the environment via the gap region or gap regions formed between the piston rod and the edge of the outlet opening. The fluid outlet thus acts in the extension movement and the extended position of the piston rod to counteract debris entry into the cylinder chamber adjacent the outlet opening by means of positive pressure. In an embodiment of the pressure-medium cylinder as a double-acting cylinder, in which the piston can also be pressurized using a working fluid in the retraction direction (in this embodiment without dynamic seals), debris entry during the extension and the retraction movement is reliably countered by positive pressure. To retract the piston rod, the piston is pressurized via the cylinder chamber adjacent the outlet opening, thereby preventing the entry of working fluid via the gap region or gap regions formed between the piston rod and the edge of the outlet opening, and preventing debris from entering until the retracted end position is reached, where a static seal is then achieved by the stop surface.

In a further embodiment, debris entry via the gap region or gap regions formed between the piston rod and the edge of the outlet opening is counteracted by means of an active positive pressure purge by the cylinder housing being designed to have at least one flushing channel that opens into the penetration channel for the piston rod, with the purge channel being pressurized together with the pressurization of a cylinder chamber. In one embodiment of the pressure-medium cylinder as a single-acting cylinder, the flushing channel is also pressurized during the extension movement together with the pressurization of the cylinder chamber, whereby working fluid enters the penetration channel and exits the space or gap regions formed between the piston rod and the edge of the outlet opening. The fluid outlet thus acts in the extension movement and the extended position of the piston rod to counteract debris entry into the cylinder chamber adjacent the outlet opening by means of positive pressure. In an embodiment of the pressure-medium cylinder as a double acting cylinder, the flushing channel is also pressurized during the retraction movement together with the respective cylinder chamber, whereby working fluid also exits in the retraction movement via the gap region or gap regions formed between the piston rod and the edge of the outlet opening and counteracts debris entry until the retracted end position is reached, where a static seal is then achieved by the stop surface.

In an embodiment of the pressure-medium cylinder as a single-acting cylinder, debris entry into the cylinder chamber adjacent the outlet opening is also prevented by means of escaping overpressure during the retraction movement by the previously pressurized chamber being designed with the ability to be ventilated via the flushing channel.

BRIEF DESCRIPTION OF THE DRAWINGS

Further measures improving the disclosure are described in greater detail below in reference to the drawings, together with the description of the preferred embodiments of the disclosure. Shown are.

DETAILED DESCRIPTION

Figure 1A:
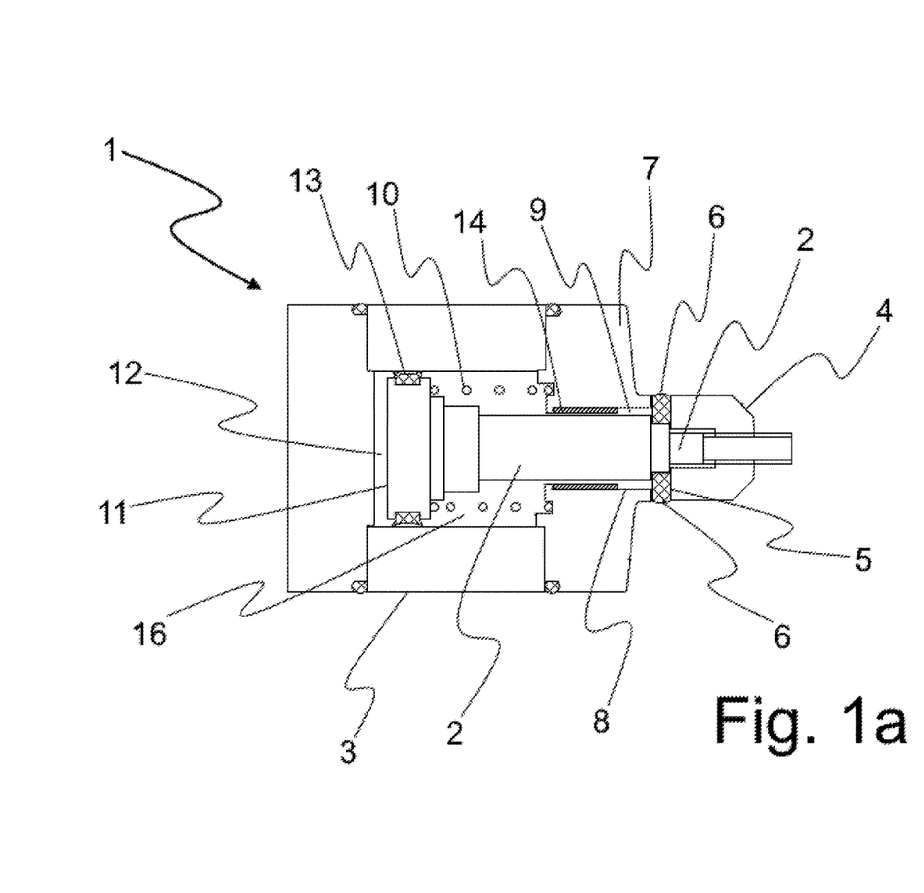
FIG. 1*a* a schematic partial sectional view of a pressure-medium cylinder with the piston rod retracted.
Figure 1B:
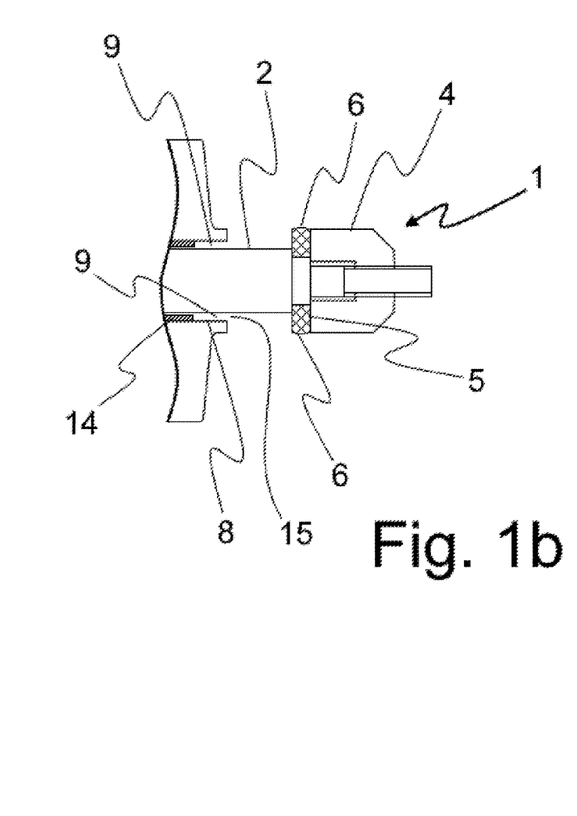
FIG. 1*b* a schematic partial sectional view of the pressure-medium cylinder according to FIG. 1 with the piston rod extended.

FIGS. 1a and 1b show a first exemplary embodiment of a pressure-medium cylinder 1 as schematic partial section representations. FIG. 1a shows the pressure-medium cylinder 1 with the piston rod 2 in the retracted end position. The piston rod 2 is formed in a piston rod portion disposed outside the cylinder housing 3 comprising the stop 4. The stop 4 comprises a stop surface 5, which extends radially from the piston rod 2 and which is designed to a sealing body 6, which also extends radially from the piston rod 2. The piston rod end face of the cylinder housing 3 is formed by the cylinder cover 7. In the retracted end position of the piston rod 2, the stop 4 contacts the end face of the cylinder housing 3 formed by the cylinder cover 7, with the sealing body 6 sealingly covering a gap region 9 formed between the piston rod 2 and the penetration channel 8. The transition from the stop 4 to the sealing body 6, which has a flat to slightly bally contour in the end position, up to the cylinder lid 7, is designed to have no steps or gaps for reasons of hygienic design guidelines. In addition, the measures generally known for the hygienic design of the cylinder housing 3 and the stop 4 can be designed to have radii and to avoid horizontal surfaces in order to further improve the drainage of cleaning agents in the specific context of application, depending on the installation position of the pressure-medium cylinder (not shown in FIGS. 1a and 2b). Reaching the end position of the piston rod 2 in the retracted state is defined by the engagement of the stop 4 with the cylinder housing, by the stop 4 stopping movement of the piston rod 2 at that moment. In the retracted end position of the piston rod 2 shown in FIG. 1a, the stop 4 is pressed against the cylinder cover 7 of the cylinder housing 3 by the return spring 10, which is designed as a compression spring. The return spring 10 is arranged in the cylinder housing 3 for this purpose in a biased direction between the piston 11 and the inner side of the cylinder cover 7. Alternatively, a sufficient sealing fit of the stop 4 on the cylinder housing 3 can also be ensured by other measures, e.g., an inclined installed position with a load on the piston rod when the rod is retracted, the biasing of the stop 4 in the retraction direction by means disposed on the outside of the pressure-medium cylinder 3, or the arrangement of a magnet on the stop surface 5 and/or the front side of the cylinder housing 3 formed by the cylinder cover 7. To extend the piston rod 2, the piston 11 is pressurized via the cylinder chamber 12. The piston 11 is dynamically sealed with the piston washer 13 against the inner wall of the cylinder housing 3. The piston rod 3 is slidably guided in the sliding bushing 14 in the penetration channel 8. The sliding bushing 14 serves only to reduce friction when sliding the piston rod 2 in the penetration channel 8, but does not seal the piston rod fluidically against the penetration channel 8. The use of the sliding bushing 14 is not necessarily required; the piston rod 2 can instead also be guided directly in the penetration channel 8, for which preferably the cylinder cover 7 and the piston rod 2 are formed from materials paired with one another, which are low-wear and low-friction. The gap region 9 continues between the sliding bushing 14 and the piston rod 2 towards the interior space of the cylinder housing 3, which is not separately numbered in FIGS. 1a and 1b for illustration reasons. FIG. 1b shows a piston rod-side cut-out of the pressure-medium cylinder 1 with the piston rod 2 in the extended position, in which the stop 4 is detached from the cylinder cover 7. In this position, the gap region 9 is released, which extends between the piston rod 2 and the edge of the outlet opening 15 of the penetration channel 8. A fluidic connection exists between the outlet opening 15 and the cylinder chamber 16 adjacent the outlet opening 15 via the gap region 9. When the pressurization of the piston 11 via the cylinder chamber 12 is finished, the piston rod 2 retracts into the cylinder housing 3 due to the biasing of the return spring 10 until the stop 4 abuts the cylinder cover 7 in the end position. In this case, the sealing body 6 brakes the movement pulse by elastically deforming and simultaneously sealingly engaging the cylinder cover 7 of the cylinder housing 3 by covering the gap region 9 formed between the piston rod 2 and the edge of the outlet opening 15.

Figure 2A:
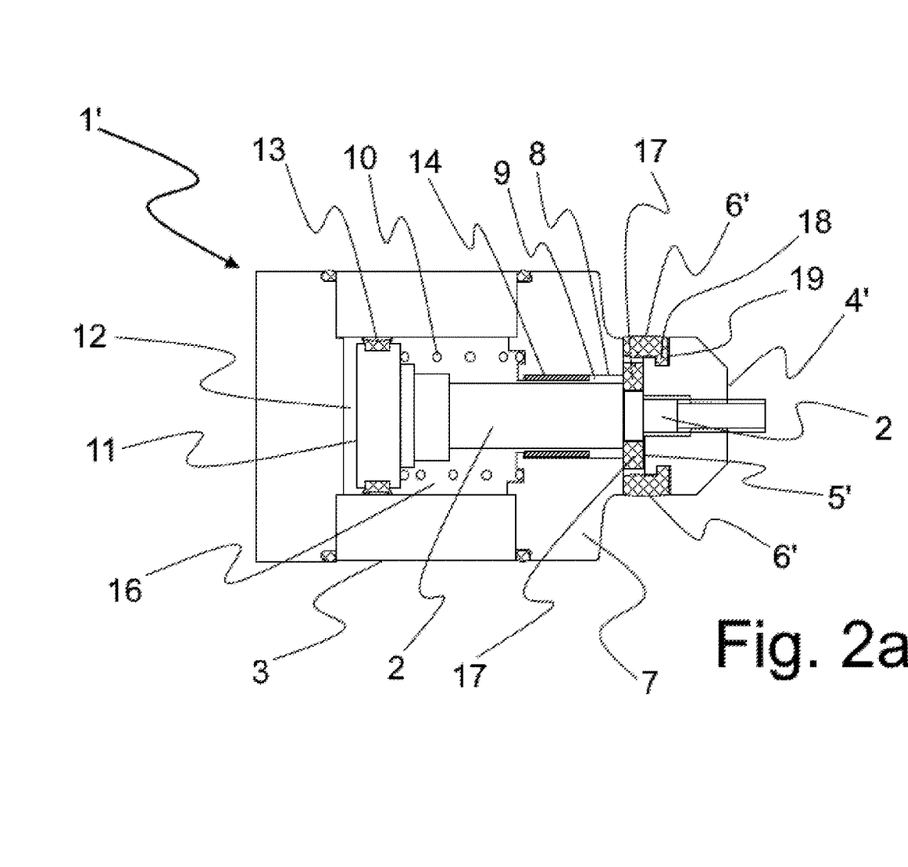
FIG. 2*a* a schematic partial sectional view of a pressure-medium cylinder according to a second embodiment with the piston rod retracted.
Figure 2B:
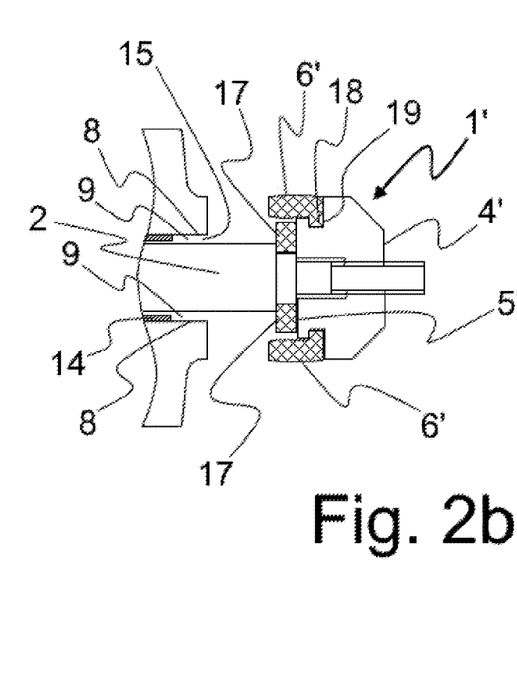
FIG. 2b a schematic partial sectional view of the pressure-medium cylinder according to FIG. 2a with the piston rod extended.

FIGS. 2a and 2b show a second exemplary embodiment of a pressure-medium cylinder 1' as schematic partial section representations. The pressure-medium cylinder 1' has a changed configuration of the stop 4' compared to the pressure-medium cylinder 1. The stop surface 5' is designed to have a radially extending brake body 17 and a sealing body 6' that extends radially from the piston rod 2 and the brake body. The sealing body 6' has a mounting height that is greater in the axial direction than the brake body 17 and protrudes this or these towards the cylinder cover 7. At the same time, the sealing body 6' has a higher resiliency than the brake body 17. Incidentally, the pressure-medium cylinder 1' is identical to the pressure-medium cylinder 1. FIG. 2a shows the pressure-medium cylinder 1' with the piston rod 2 in the retracted end position. FIG. 2b shows a piston rod-side cut-out of the pressure-medium cylinder 1', with the piston rod 2 in the extended position, in which the stop 4' is detached from the cylinder cover 7. When the pressurization of the piston 11 via the cylinder chamber 12 is finished, the piston rod 2 retracts into cylinder housing 3 due to the biasing of the return spring 10 until the stop 4' abuts the cylinder cover 7 in the end position. In this case, the sealing body 6' first contacts the cylinder cover 7 of the cylinder housing 3, whereby it deforms. Starting from a corresponding deformation path, the brake body 17 also contacts the cylinder cover 7 of the cylinder housing 3 and receives the main part of the motivating energy by also deforming until the end position is reached. The sealing body 6' sealingly contacts the cylinder cover 7 of the cylinder housing 3 by extending around the gap region 9 formed between the piston rod 2 and the edge of the outlet opening 15. In this embodiment, too, the transition from the stopper 4' to the sealing body 6', which has a flat to slightly bally contour in the end position, up to the cylinder lid 7 is designed to be flush, without steps or gaps. In addition, the brake body 17 constructively limits the compression of the sealing body 6', which reduces its material fatigue during the product life and thus improves the reliability of the sealing function with respect to hygienic design requirements. The material properties of the sealing body 6' and the brake body 17 can be adjusted such that, according to the requirements in the respective context of application, the kinetic energy is received by the brake body 17 in a suitable manner and, on the other hand, a sufficient seal is ensured by the positive fit of the sealing body 6'. To secure the sealing body 6' to the stopper 4', the sealing body 6' is designed to have a collar 18 angled perpendicularly in the direction of the piston rod 2, which collar contacts a corresponding, circumferential groove 19 on the lateral surface of the stopper 4' in a positive locking manner.

Figure 3A:
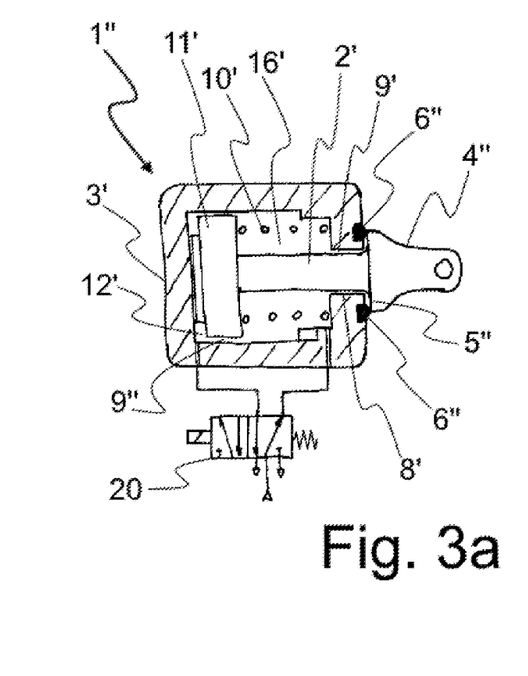
FIG. 3a a schematic partial sectional view of a pressure-medium cylinder according to a third embodiment with the piston rod retracted.
Figure 3B:
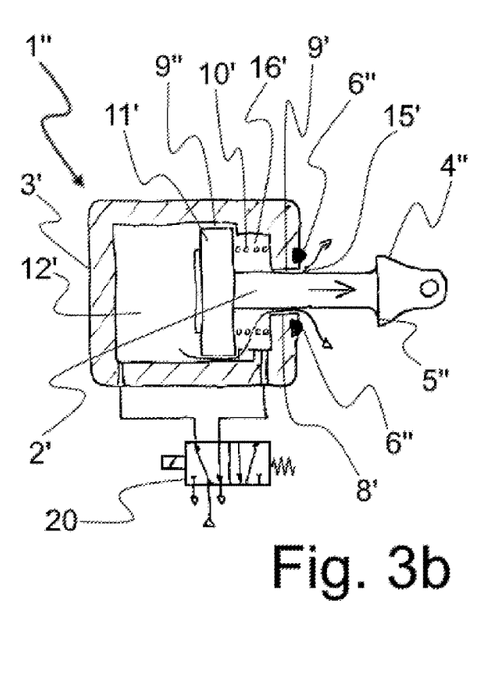
FIG. 3b a schematic partial sectional view of the pressure-medium cylinder according to FIG. 3a with the piston rod during the extension movement.
Figure 3C:
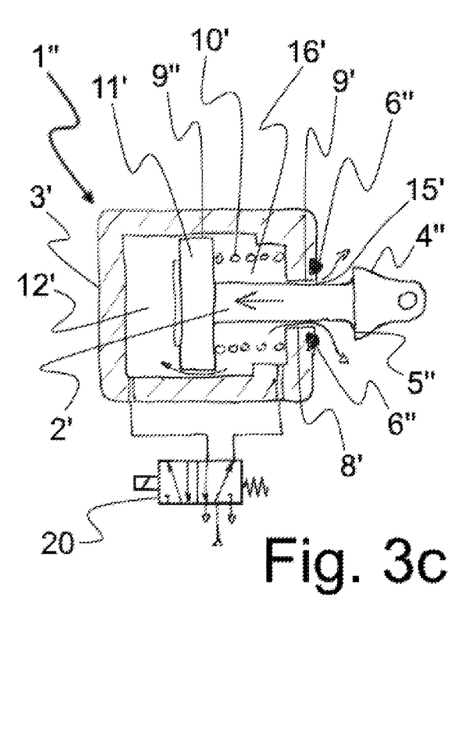
FIG. 3c a schematic partial sectional view of the pressure-medium cylinder according to FIG. 3a with the piston rod during the retraction movement.

FIGS. 3a to 3c show a third exemplary embodiment of a pressure-medium cylinder 1" as schematic partial cross-sectional diagrams. The pressure-medium cylinder 1" is designed as a double-acting cylinder by the cylinder chambers 12' and 16' on both sides of the piston 11' being alternately pressurizable and ventable by way of the 5/2 directional control valve 20. FIG. 3a shows the pressure-medium cylinder 1" with the piston rod 2' in the retracted end position. In this position, the stop 4" contacts the stop surface 5" extending radially from the piston rod 2' on the piston rod end face of the cylinder housing 3'. The end face of the cylinder housing 3' is designed to have a sealing body 6" radially surrounding the exit opening 15', which sealing body in the retracted end position of the piston rod 2' sealingly contacts the stop surface 5'. For attachment, the sealing body 6" is inserted in a form-locking manner into a corresponding groove with a rear section on the outside of the cylinder housing 3'. The transition from stop 4" to the sealing body 6" and up to the end face of the cylinder housing 3' is in this case designed in accordance with hygienic design specifications, without steps or gaps. Furthermore, the transition is designed without horizontal surfaces in order to ensure drainage of cleaning liquids without residues. The stop surface 5" in the retracted end position of the piston rod 2' sealingly covers the gap region 9' formed between the piston rod 2' and the edge of the outlet opening. The piston 11' is designed to be sealless, which is why a gap region 9" is also formed between the piston 11' and the inner wall of the cylinder housing 3'. To extend the piston rod 2', the chamber 12' of the pressure-medium cylinder 1" is pressurized via the 5/2 directional control valve 20, as shown in FIG. 3b. The piston rod 2' moves to its extended position, whereby working fluid passes into the cylinder chamber 16' adjacent to the outlet opening 15' due to the positive pressure in the chamber 12' through the gap region 9" and from there into the environment via the gap region 9' through the outlet opening 15'. The fluid outlet acts during the extension movement and in the extended position of the piston rod 2' to counteract debris entry into the cylinder chamber 16' adjacent the outlet opening by means of positive pressure, as a result of which permanent leakage takes place. To retract the piston rod 2', the chamber 16' of the pressure-medium cylinder 1" is pressurized by the 5/2 directional control valve 20, as shown in FIG. 3c. The piston rod 2' moves to its retracted position, whereby working fluid passes into the environment through the outlet opening 15' via the gap region 9' due to the positive pressure in the chamber 16'. During the retraction movement, the fluid outlet acts to counteract debris entry into the cylinder chamber 16' adjacent the outlet opening by positive pressure, as a result of which permanent leakage takes place. In this embodiment of the pressure-medium cylinder 1", the return spring 10' serves to ensure the seal, even in the unpressurized state, e.g., when the compressed air supply is completely switched off.

Figure 4A:
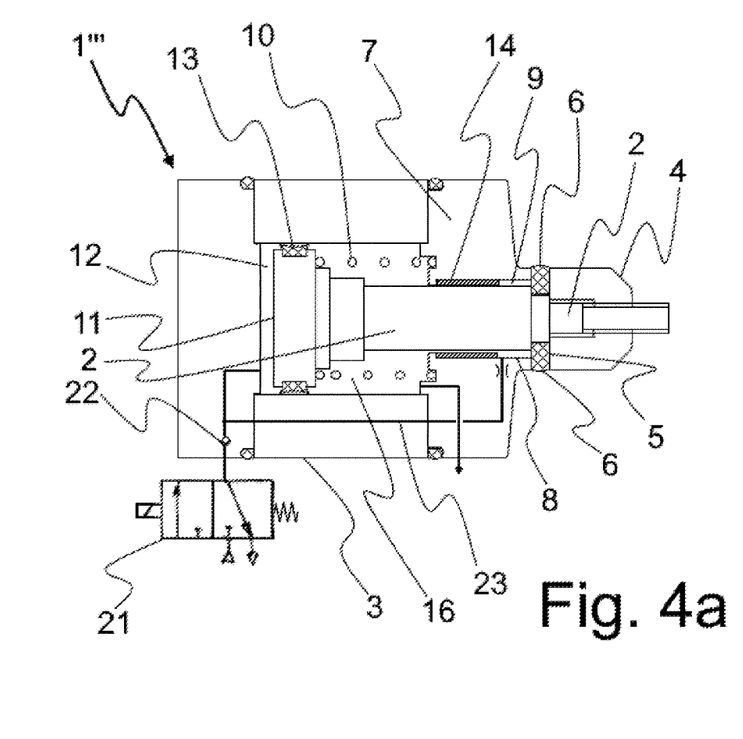
FIG. 4a a schematic partial sectional view of a pressure-medium cylinder according to a fourth embodiment with the piston rod retracted.
Figure 4B:
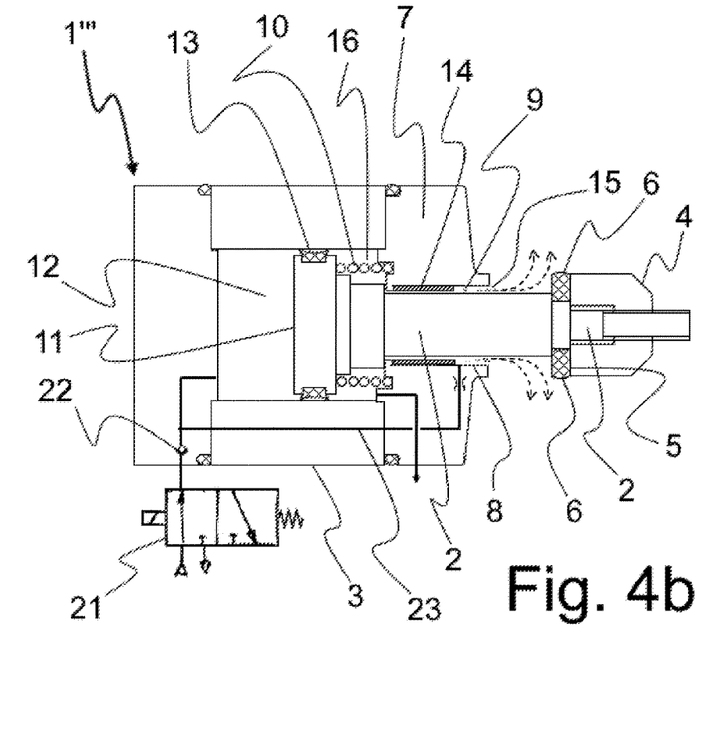
FIG. 4b a schematic partial sectional view of the pressure-medium cylinder according to FIG. 4a with the piston rod extended.

FIGS. 4a and 4b show a fourth exemplary embodiment of a pressure-medium cylinder 1''' as schematic partial sectional diagrams. Regarding the pressure-medium cylinder 1, identical design features of the pressure-medium cylinder 1''' are marked with identical reference numbers. The pressurized cylinder 1''' is designed as a single-acting cylinder by the cylinder chamber 12 being pressurizable via the 3/2 directional control valve 21 in a shift position. Further, the pressurized cylinder 1''' includes the check valve 22, through which venting of the cylinder chamber 12 via the compressed air outlet of the 3/2 directional control valve 21 in its resting position is prevented. When the chamber 12 is pressurized via the 3/2 directional control valve 21, working fluid passes in parallel via the flushing channel 23 into the penetration channel 8, since the flushing channel 23 opens into the penetration channel 8. In the extension movement of (and in the extended position of) the piston rod 2, as shown in FIG. 4b, working fluid thus enters the environment via the penetration channel 8 at the outlet opening 15 and counteracts debris entry into the cylinder chamber 16. When the 3/2 directional control valve 21 returns to its closed rest position, the return spring 10 biased in the retraction direction causes the piston rod 2 to retract. In this case, the cylinder chamber 12 is not vented via the compressed air outlet of the 3/2 directional control valve 21, but rather the flushing channel 23, due to the blocking position of the check valve 22. Working fluid therefore also exits into the environment in the retraction movement of the piston rod 2 via the penetration channel 8 at the outlet opening 15 and acts to prevent entry of debris into the cylinder chamber 16.

Figure 5A:
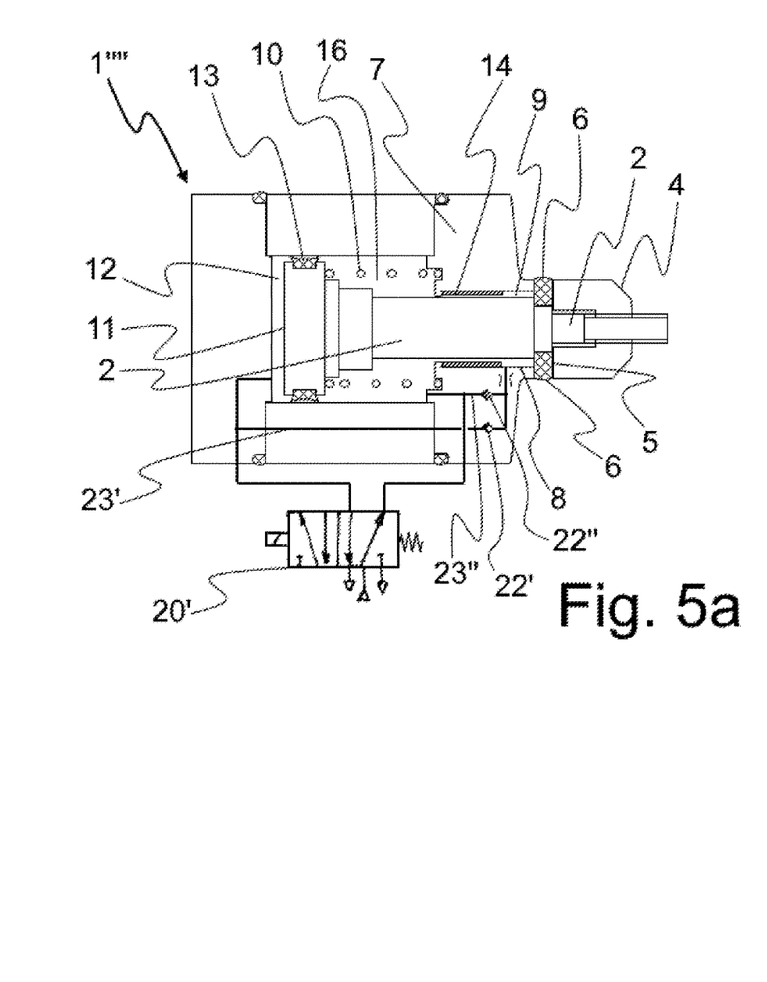
FIG. 5a a schematic partial sectional view of a pressure-medium cylinder according to a fifth embodiment with the piston rod retracted.
Figure 5B:
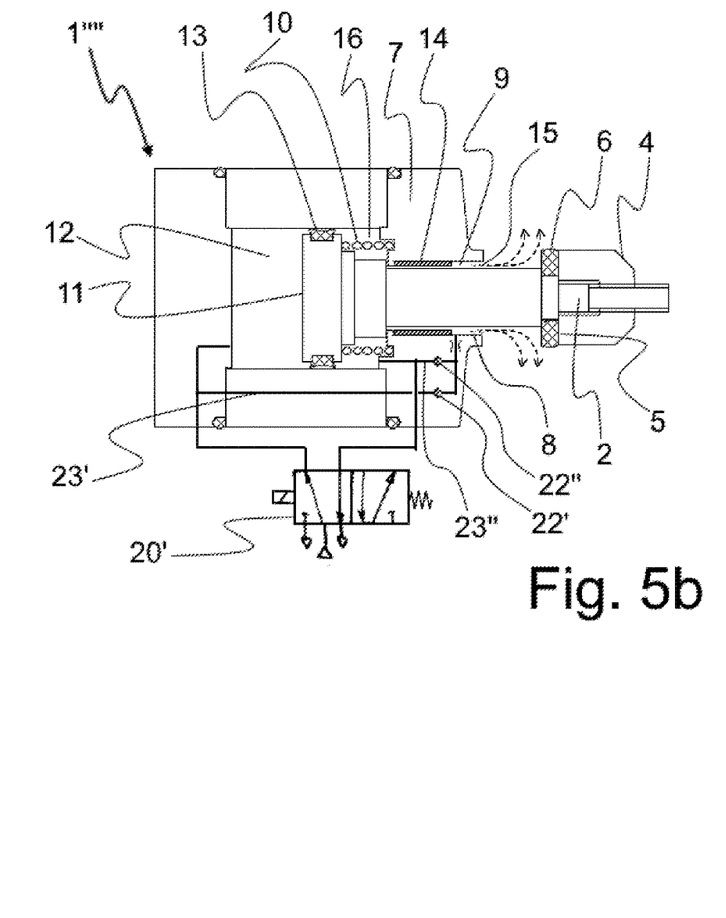
FIG. 5b a schematic partial sectional view of the pressure-medium cylinder of FIG. 5a with the piston rod extended.

FIGS. 5a and 5b show a fifth exemplary embodiment of a pressure-medium cylinder 1'''' as schematic partial cross-sectional diagrams. Identical design features of the pressure-medium cylinder 1'''' and the pressure-medium cylinder 1 are identified with identical reference numbers. The pressurized cylinder 1'''' is designed as a double-acting cylinder by the cylinder chambers 12 and 16 formed on both sides of the piston 11 being alternately pressurizable and ventable by the 5/2 directional control valve 20'. When the chamber 12 is pressurized via the 5/2 directional control valve 20', working fluid passes in parallel via the flushing channel 23' into the penetration channel 8, since the flushing channel 23' opens into the penetration channel 8. The check valve 22' opens in this direction of flow. Using the check valve 22", the connection from the flushing channel 23' via the flushing passage 23" to the cylinder chamber 16 is simultaneously blocked. During the extension movement of and in the extended position of the piston rod 2, as shown in FIG. 5b, working fluid thus enters the environment via the penetration channel 8 at the outlet opening 15 and acts to counteract entry of debris into the cylinder chamber 16. The second cylinder chamber 16 is vented during the extension motion of and the extended position of the piston rod 2 simultaneously via the compressed air outlet of the 5/2 directional control valve 20'. When the chamber 16 is pressurized via the 5/2 directional control valve 20', working fluid also passes in parallel via the flushing channel 23 that opens into the penetration channel 8. The check valve 22" opens in this direction of flow. By means of the check valve 22', the connection from the flushing channel 23' to the cylinder chamber 12 is simultaneously blocked. Even in the retraction movement of the piston rod 2, working fluid therefore exits into the environment via the penetration channel 8 at the outlet opening 15 and counteracts debris entry into the cylinder chamber 16. In this embodiment of the pressure-medium cylinder 1'''', the return spring 10 serves to ensure the seal, even in the unpressurized state, e.g., when the compressed air supply is completely switched off.

LIST OF REFERENCE SIGNS 1, 1', 1'', 1''', 1'''' Pressure-medium cylinder
2, 2' Piston rod
3, 3' Cylinder housing
4, 4', 4'' Stop
5, 5', 5'' Stop surface
6, 6', 6'' Sealing body
7 Cylinder cover
8 Penetration channel
9, 9', 9'' Gap region
10, 10' Return spring
11, 11' Piston
12, 12', 16, 16' Cylinder chamber
13 Piston seal
14 Sliding bushing
15, 15' Outlet opening
17 Brake body
18 Collar
19 Groove
20, 20' 5/2 directional control valve
21 3/2 directional control valve
22, 22', 22'' Check valve
23, 23', 23'' Flushing channel

The invention claimed is:

1. A pressure-medium cylinder comprising:
a cylinder housing defining an end face and an outlet opening through the end face;
a piston disposed in a cylinder interior of the cylinder housing and configured for axial movement relative to the cylinder housing; and
a piston rod connected to the piston and configured to extend from the piston toward the end face and through the outlet opening,
wherein a portion of the piston rod disposed outside of the cylinder interior in an outside environment comprises a stop surface extending radially from the piston rod,
wherein the stop surface is configured to contact the cylinder housing when the piston rod is retracted to an end position,
wherein the stop surface sealingly covers and/or extends around a gap region between the piston rod and a radially inner edge of the outlet opening when the piston rod is retracted to the end position,
wherein one of the stop surface and the end face includes a sealing body configured to seal the cylinder interior and the gap region from the outside environment when the piston rod is retracted to the end position,
wherein the sealing body extends radially from the piston rod or radially surrounds the piston rod, and
wherein the stop surface includes at least one brake body extending radially from the sealing body or arranged radially adjacent to the sealing body.

2. The pressure-medium cylinder according to claim 1, further comprising:
a return spring arranged in the cylinder housing and configured to act on the piston in a direction configured to retract the piston rod to the end position.

3. The pressure-medium cylinder according to claim 1, wherein at least one additional gap region is formed between the piston and an inner wall of the cylinder housing.

4. The pressure-medium cylinder according to claim 1, wherein:
the cylinder housing includes at least one flushing channel configured to open into a penetration channel for the piston rod, and
the flushing channel is pressurized together with pressurization of a cylinder chamber of the cylinder housing.

5. The pressure-medium cylinder according to claim 4, wherein the cylinder chamber is ventable via the flushing channel.

6. The pressure-medium cylinder according to claim 1, wherein permanent leakage takes place through the gap region and the outlet opening in response to a positive pressure in the cylinder interior that acts to move the piston and the piston rod to an extended position.

7. The pressure-medium cylinder according to claim 1, wherein during retraction of the piston rod to the end position working fluid passes into the outside environment from the cylinder interior through the outlet opening, such that debris entry into the cylinder interior through the outlet opening is counteracted.

8. A pressure-medium cylinder, comprising:
a cylinder housing defining an end face and an outlet opening;
a piston disposed in the cylinder housing and configured for axial movement relative to the cylinder housing; and
a piston rod connected to the piston and configured to penetrate the cylinder housing toward the end face through the outlet opening,
wherein the piston rod comprises a stop surface extending radially from the piston rod in a piston rod portion disposed outside of the cylinder housing,
wherein the stop surface is configured to contact the cylinder housing in an end position during retracting of the piston rod,
wherein the stop surface sealingly covers and/or extends around at least one gap region between the piston rod and an edge of the outlet opening,
wherein the stop surface includes at least one brake body extending radially from the piston rod or arranged radially adjacent to the piston rod, and a sealing body extending radially from or radially surrounding the at least one brake body, and
wherein the stop surface is configured to sealingly cover the at least one gap region between the piston rod and the edge of the outlet opening in the end position.

9. The pressure-medium cylinder according to claim 8, further comprising:
a return spring arranged in the cylinder housing and configured to act on the piston in a direction configured to retract the piston rod to the end position.

10. The pressure-medium cylinder according to claim 8, wherein at least one additional gap region is formed between the piston and an inner wall of the cylinder housing.

11. The pressure-medium cylinder according to claim 8, wherein:
the cylinder housing includes at least one flushing channel configured to open into a penetration channel for the piston rod, and
the flushing channel is pressurized together with pressurization of a cylinder chamber of the cylinder housing.

12. The pressure-medium cylinder according to claim 11, wherein the cylinder chamber is ventable via the flushing channel.

13. The pressure-medium cylinder according to claim 8, wherein permanent leakage takes place through the at least one gap region and the outlet opening in response to a positive pressure in a cylinder interior of the cylinder housing that acts to move the piston and the piston rod to an extended position.

14. The pressure-medium cylinder according to claim 8, wherein during retraction of the piston rod to the end position working fluid passes into an outside environment from a cylinder interior of the cylinder housing through the outlet opening, such that debris entry into the cylinder interior through the outlet opening is counteracted.

15. A pressure-medium cylinder, comprising:
a cylinder housing defining an end face and an outlet opening;
a piston disposed in the cylinder housing and configured for axial movement relative to the cylinder housing; and
a piston rod connected to the piston and configured to penetrate the cylinder housing toward the end face through the outlet opening,
wherein the piston rod comprises a stop surface extending radially from the piston rod in a piston rod portion disposed outside of the cylinder housing,
wherein the stop surface is configured to contact the cylinder housing in an end position during retracting of the piston rod,
wherein the stop surface sealingly covers and/or extends around at least one gap region between the piston rod and an edge of the outlet opening,
wherein the end face of the cylinder housing includes (i) at least one brake body radially extending from the edge of the outlet opening or arranged radially adjacent to the edge of the outlet opening, and (ii) a sealing body extending radially from or radially surrounding the at least one brake body, and
wherein the sealing body is configured to sealingly contact the stop surface in the end position.

16. The pressure-medium cylinder according to claim 15, further comprising:
a return spring arranged in the cylinder housing and configured to act on the piston in a direction configured to retract the piston rod to the end position.

17. The pressure-medium cylinder according to claim 15, wherein at least one additional gap region is formed between the piston and an inner wall of the cylinder housing.

18. The pressure-medium cylinder according to claim 15, wherein:
the cylinder housing includes at least one flushing channel configured to open into a penetration channel for the piston rod, and
the flushing channel is pressurized together with pressurization of a cylinder chamber of the cylinder housing.

19. The pressure-medium cylinder according to claim 18, wherein the cylinder chamber is ventable via the flushing channel.

20. The pressure-medium cylinder according to claim 15, wherein permanent leakage takes place through the at least one gap region and the outlet opening in response to a positive pressure in a cylinder interior of the cylinder housing that acts to move the piston and the piston rod to an extended position.

21. The pressure-medium cylinder according to claim 15, wherein during retraction of the piston rod to the end position working fluid passes into an outside environment from a cylinder interior of the cylinder housing through the outlet opening, such that debris entry into the cylinder interior through the outlet opening is counteracted.

22. A pressure-medium cylinder, comprising:
a cylinder housing defining an end face and an outlet opening through the end face;
a piston disposed in a cylinder interior of the cylinder housing and configured for axial movement relative to the cylinder housing; and
a piston rod connected to the piston and configured to extend from the piston toward the end face and through the outlet opening,
wherein a portion of the piston rod disposed outside of the cylinder interior in an outside environment comprises a stop surface extending radially from the piston rod,
wherein the stop surface is configured to contact the cylinder housing when the piston rod is retracted to an end position,
wherein the stop surface sealingly covers and/or extends around a gap region between the piston rod and a radially inner edge of the outlet opening when the piston rod is retracted to the end position,
wherein one of the stop surface and the end face includes a sealing body configured to seal the cylinder interior and the gap region from the outside environment when the piston rod is retracted to the end position,
wherein the end face includes the sealing body,
wherein the sealing body extends radially from the outlet opening, or the sealing body radially surrounds the outlet opening,
wherein the sealing body is configured to sealingly contact the stop surface when the piston rod is retracted to the end position, and
wherein the end face of the cylinder housing includes at least one brake body extending radially from the sealing body or arranged adjacent to the sealing body.

23. The pressure-medium cylinder according to claim 22, further comprising:
a return spring arranged in the cylinder housing and configured to act on the piston in a direction configured to retract the piston rod to the end position.

24. The pressure-medium cylinder according to claim 22, wherein at least one additional gap region is formed between the piston and an inner wall of the cylinder housing.

25. The pressure-medium cylinder according to claim 22, wherein:
the cylinder housing includes at least one flushing channel configured to open into a penetration channel for the piston rod, and
the flushing channel is pressurized together with pressurization of a cylinder chamber of the cylinder housing.

26. The pressure-medium cylinder according to claim 25, wherein the cylinder chamber is ventable via the flushing channel.

27. The pressure-medium cylinder according to claim 22, wherein permanent leakage takes place through the gap region and the outlet opening in response to a positive pressure in the cylinder interior that acts to move the piston and the piston rod to an extended position.

28. The pressure-medium cylinder according to claim 22, wherein during retraction of the piston rod to the end position working fluid passes into the outside environment from the cylinder interior through the outlet opening, such that debris entry into the cylinder interior through the outlet opening is counteracted.

* * * * *